C. M. OERTEL.
DIRIGIBLE HEADLIGHT SUPPORT.
APPLICATION FILED MAR. 19, 1912.
1,060,486.
Patented Apr. 29, 1913.
Fig. 1.
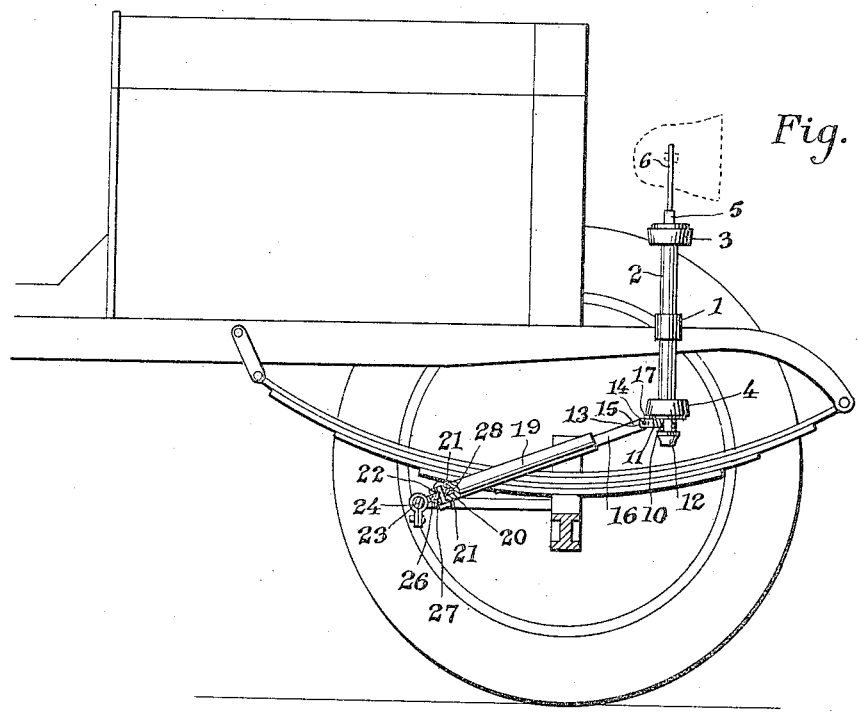
Fig. 2.
Fig. 3.
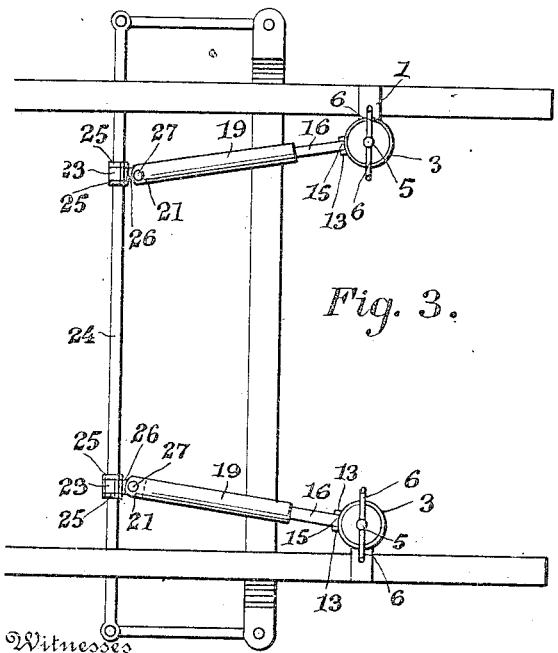
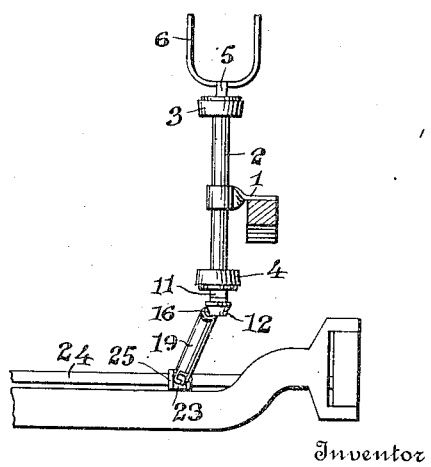
Witnesses
M. F. Gannett
Dudley B. Howard
Inventor
C. M. Oertel
By Victor J. Evans
Attorney

UNITED STATES PATENT OFFICE.

CLARENCE M. OERTEL, OF MILWAUKEE, WISCONSIN.

DIRIGIBLE HEADLIGHT-SUPPORT.

1,060,486.  Specification of Letters Patent.  Patented Apr. 29, 1913.

Application filed March 19, 1912. Serial No. 684,685.

*To all whom it may concern:*

Be it known that I, CLARENCE M. OERTEL, a citizen of the United States, residing at Milwaukee, in the county of Milwaukee and State of Wisconsin, have invented new and useful Improvements in Dirigible Headlight-Supports, of which the following is a specification.

My invention relates to headlight supports for automobiles the object being to provide effective operating means which will not be affected by the jarring motion of the vehicle.

Other objects of the invention will appear as the following specific description is read in connection with the accompanying drawing, which forms a part of this specification, in which:—

Figure 1 is a side elevation of the device attached to a portion of an automobile. Fig. 2 is a broken front elevation. Fig. 3 is a similar plan view.

In the drawing, the numeral 1 designates the supporting bracket which is secured in suitable manner to the forward end of the chassis, and which supports the vertical bearing shell 2. The upper and lower end of the shell 2 are formed so as to provide bearings 3 and 4 respectively for the vertical shaft 5, which is rotatably mounted in the shell 2. The shaft 5 is provided at its upper extremity with the lamp brackets 6 and has its lower end extended below the lower end of the shell 2, where it is reduced and formed rectangular in the cross section. This rectangular portion of the shaft is adapted to receive the rectangular opening in the hinge block 11. The lower extremity of the shaft 5 is screw threaded so as to receive a suitable binding nut 12. The hinge block 11 is provided with parallel bifurcated portions 13, which have alined horizontal openings 14. An extremity 15 of a connecting rod 16 is positioned between the bifurcated portions 13 of the hinge block and is pivotally mounted therein by means of a pin 17 passing through the opening 18 therein and the openings 14 in the portions 13. The opposite portion of the rod 16 is slidably mounted within a tube member 19 which has its free end made solid and provided with a horizontal slot 20. The bifurcated portions 21 formed by this slot have alined transverse openings 22. A clamping collar 23 is rotatably mounted on the steering rod 24, and is held against slidable movement thereon by means of the fixed collars 25. The lateral lug 26 of the collar 23 is received by the slot 20 in the member 19 and is pivotally mounted therein by means of the pin 27 which passes through the openings 22 and the opening 28 in the lateral lug 26.

The hinged joint between the connecting rod 16 and the block 11 permits vertical movement of the automobile chassis and the axle without danger of jarring the lamp support. The telescopic connection between the tube 19 and rod 16 allows for the lateral movement of the steering rod.

I claim:—

1. In a device of the class described, the combination with an automobile chassis, of a bearing bracket attached thereto, a vertical lamp-supporting shaft journaled in said bracket, a connecting rod pivotally attached to the lower end of said shaft for vertical swinging movement, a tube member slidably receiving said rod, and an attaching collar rotatably mounted upon the transversely movable connecting bar of the steering mechanism and connected to the free end of said tube member by a vertically disposed pivot.

2. In a device of the class described, the combination with an automobile chassis, of a bearing bracket attached thereto, a vertical lamp-supporting shaft journaled in said bracket, a connecting rod pivotally attached to the lower end of said shaft for vertical swinging movement, a tube member slidably receiving said rod, an attaching collar rotatably mounted upon the transversely movable connecting bar of the steering mechanism and connected to the free end of said tube member by a vertically disposed pivot, and means for securing said collar against slidable movement upon the said connecting bar.

In testimony whereof I affix my signature in presence of two witnesses.

CLARENCE M. OERTEL.

Witnesses:
A. D. MOODY,
A. H. SCHRENK.

Copies of this patent may be obtained for five cents each, by addressing the "Commissioner of Patents, Washington, D. C."